United States Patent
Siegfriedsen

(10) Patent No.: US 6,439,832 B1
(45) Date of Patent: Aug. 27, 2002

(54) DEVICE FOR PREVENTING PENETRATION OF CORROSIVE SALT PARTICLES IN AN OFFSHORE WIND ENERGY FACILITY

(75) Inventor: Sonke Siegfriedsen, Friedrichstadt (DE)

(73) Assignee: Aerodyn Engineering GmbH, Rendsburg (DE)

(*) Notice: Subject to any disclaimer, the term of this patent is extended or adjusted under 35 U.S.C. 154(b) by 0 days.

(21) Appl. No.: 09/868,954
(22) PCT Filed: Dec. 10, 1999
(86) PCT No.: PCT/DE99/03944
§ 371 (c)(1), (2), (4) Date: Jun. 22, 2001
(87) PCT Pub. No.: WO00/39459
PCT Pub. Date: Jul. 6, 2000

(30) Foreign Application Priority Data
Dec. 23, 1998 (DE) .......................... 198 59 628

(51) Int. Cl.[7] .................................................. F03D 1/00
(52) U.S. Cl. ...................... 415/4.3; 415/121.2; 415/908
(58) Field of Search .......................... 415/4.5, 4.3, 908, 415/26, 121.2; 290/44, 55

Primary Examiner—Edward K. Look
Assistant Examiner—Richard A. Edgar
(74) Attorney, Agent, or Firm—Larson & Larson, P.A.; James E. Larson

(57) ABSTRACT

Device for preventing the penetration of corrosively acting salt particles into the generator and gear area of an offshore wind power plant, with an air pressure generator for introducing air under an overpressure into at least a substantially closed part of the generator and gear area, and a filtering device connected upstream of the generator and gear area in the flow direction for the separation of moisture and salt particles from the air to be introduced into the area by the air pressure generator.

20 Claims, 1 Drawing Sheet

DEVICE FOR PREVENTING PENETRATION OF CORROSIVE SALT PARTICLES IN AN OFFSHORE WIND ENERGY FACILITY

PRIOR APPLICATIONS

This application is a §371 U.S. National Phase application which bases priority on International Application No. PCT/DE99/03944, filed Dec. 10, 1999, which in turn bases priority on German Application No. DE 198 59 628.6, filed Dec. 23, 1998.

BACKGROUND OF THE INVENTION

1. Field of Invention

The invention relates to a device for preventing the penetration of corrosively acting salt particles into the generator and gear area of a wind power plant, particularly an offshore wind power plant.

2. Description of the Prior Art

Wind power plants designed for offshore use have a substantially encapsulated generator and gear area, which as a result of maintenance only being possible with considerable effort and cost, failure and maintenance risks are reduced to a minimum.

A particular problem for offshore use is the naturally existing salt-containing air, which can penetrate in small amounts, past seals into the interior, where it forms in the long term salt-containing, and consequently, hygroscopic lubricating films which, due to their electrically conductive properties, can give rise to short-circuits in control and monitoring installations, while also giving rise to corrosion problems.

The problem of the invention is to prevent the formation of such corrosively acting films in that salt particles are prevented from penetrating.

SUMMARY OF THE INVENTION

According to the invention this problem is solved by a device having the features of the main claim. The sub-claims give advantageous embodiments.

Instead of providing an ever more complicated seal which, if it has to be opened is still accessible to the ambient air, it is proposed by using air generating means to introduce air under an over pressure into a substantially encapsulated generator and gear area. Use is preferably made of an air pressure generator and a filtering device for separating liquid and salt particles, so that during operation in continuous manner drier and salt particle-free air is introduced, which prevents the formation of lubricating films, and simultaneously as a result of the over pressure created, prevents the unintentional penetration of external air through small gaps with a countercurrent.

Said filtering device can be a turbulence chamber, upstream of which is located an air compressor. In the turbulence chamber the air flows in a rapid circular path and must centrally leave the turbulence chamber counter to the centrifugal force. However, water or salt particles are deposited on the outer edge through centrifugal force and can then be removed.

In an alternative embodiment, in the case of an air inlet located on the back of the wind power plant, long depositing or settling hoses using the wind power plant tower length with a collecting device provided on the bottom can deliver the air into an over pressure zone in the generator and gear area.

It is also proposed to provide a pressure sensor making it possible by means of a remote control to monitor the necessary air pressure generation. If e.g. the necessary capacitor of a compressor rises or if in spite of the full capacity the compressor is unable to maintain the pressure, this enables conclusions to be drawn concerning the state of the compressor or the sealing of the generator and gear encapsulation.

Morever, in the case of high outside air speeds, it could be appropriate to increase the pressure in the generator and gear area. Any salt particles then penetrating through the higher external pressure are prevented from forming lubricating films in the interior by the dried air passing out as a result of the higher pressure prevailing in the interior.

Further, hollow components of the wind power plant could also be placed in this way under pressure.

A device operating with no electric power supply with e.g. a flow-caused air inlet port building up a dynamic pressure and/or an air outlet port building up a suction vacuum, would be implementable in a very operationally reliable manner without great additional cost.

DESCRIPTION OF THE DRAWINGS

Further advantages of the invention can be gathered from the following description of a preferred embodiment relative to the attached drawing, wherein.

DETAILED DESCRIPTION OF THE PREFERRED EMBODIMENTS

Figure 1:
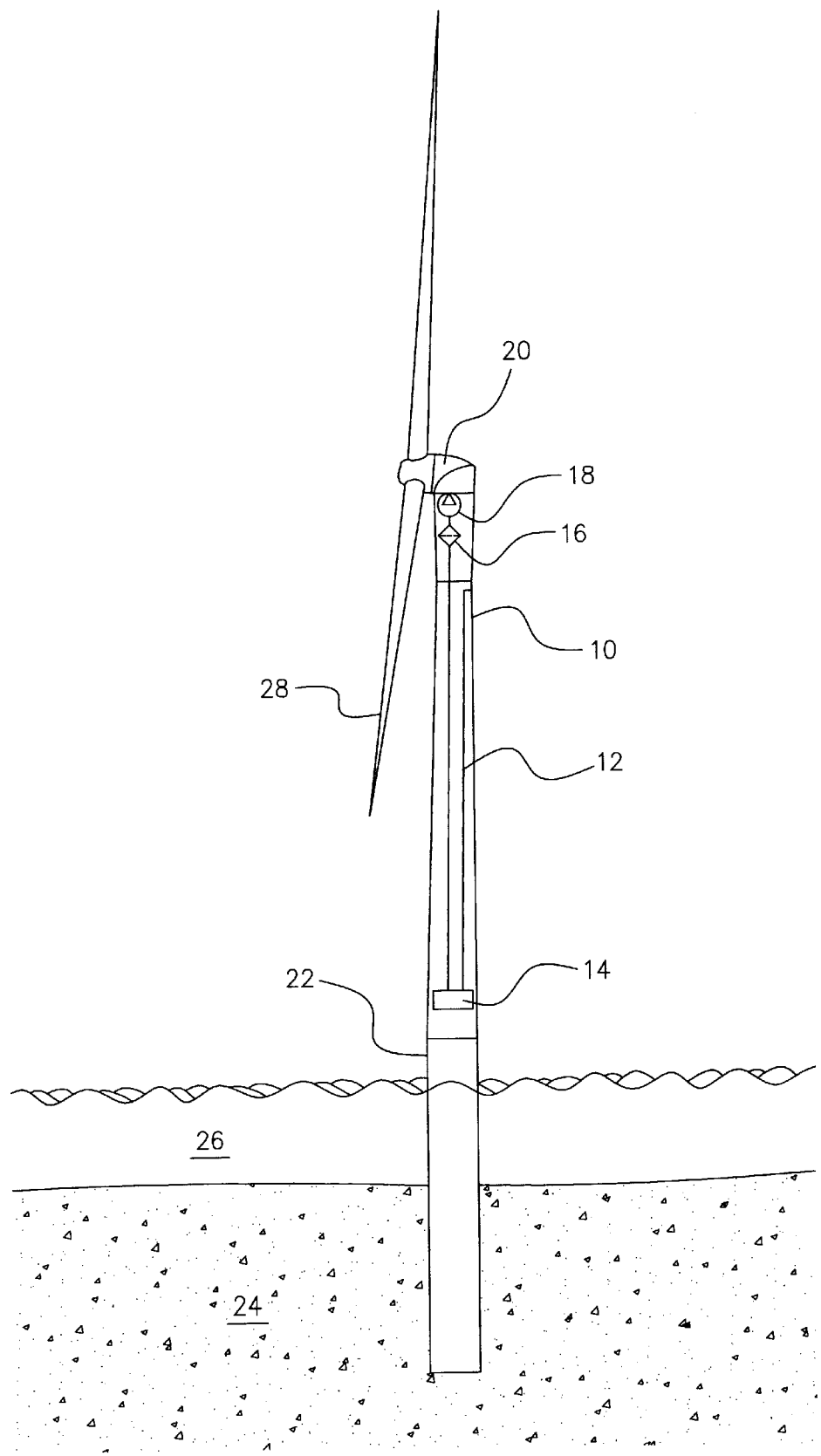
FIG. 1 shows a diagrammatic wind power plant in side view with a tower shown in section.

A device for preventing the penetration of corrosively acting salt particles into the generator and gear area of a wind power plant located in the tower thereof in FIG. 1, essentially comprises on the down wind side in the higher tower area, i.e., in the vicinity of the generator and gear, an air inlet 10, to which is connected depositing or settling hoses 12 located in the tower interior and which advantageously terminate in a depositing or settling tank 14 in the lower region. For the easy discharge of any penetrating water, said settling tank 14 is advantageously located above the water surface.

A lower tower section rests on the sea bed 24 and projects through a water layer 26. Upwards from the settling tank 14 there is at least one further settling hose, which introduces dry air advantageously through a further filtering device 16 and a compressor 18 into an overpressure zone, namely, substantially in the generator and gear area 20.

As a result of the long vertical paths, particles are advantageously collected in the settling tank 14, and only very light particles, if at all, enter the filtering device 16.

It is possible to obviate the need for the compressor 18 if air inlet ports 10 caused by the flow and building up a dynamic pressure and/or air outlet ports building up a suction pressure, lead to an introduction pressure difference introducing air into the generator and gear area 20.

To ensure an overpressure there, it would also be conceivable to place a jacket or envelope under a vacuum. This overpressure ensures that no salt particles and no moisture can penetrate through passages and the like into the gear-generator area 20, and which would form crusts there if they were deposited, more particularly, on gear wheels and would lead to premature wear and, in particular, to short maintenance intervals.

Having thus described the invention, what is claimed and desired to be secured by Letters Patent is:

1. A device for prohibiting the penetration of corrosively acting salt particles into a generator and gear area of a wind power plant, the device comprising:
   a) an air pressure generator introducing air under an overpressure into at least a substantially closed portion of the wind power plant generator and gear area; and
   b) filtering means coupled along an air flow channel before the generator and gear area for separating moisture and salt particles from air introduced into the generator and gear area by the air pressure generator.

2. The device of claim 1, wherein the air pressure generator is a compressor.

3. The device of claim 1, wherein the generator and gear area is located in a top portion of the wind power plant.

4. The device of claim 1, wherein the filtering means is a turbulence chamber.

5. The device of claim 1, further comprising:
   a) an air inlet port disposed proximal to the generator and gear area along a downwind side of the wind power plant;
   b) a settling hose coupled at a first end to the air inlet port and at a second end to the filtering means; and
   c) a settling tank coupled along the settling hose intermediate the air inlet port and the filtering means.

6. The device of claim 1, further comprising an air pressure sensor for monitoring air pressure within the wind power plant generator and gear area and for regulating the capacity of the air pressure generator.

7. The device of claim 1, further comprising at least one flow-caused air inlet opening for building up a dynamic pressure and producing an introduction pressure difference within the wind power plant generator and gear area.

8. The device of claim 1, further comprising an air outlet opening for building up a suction vacuum and producing an introduction pressure difference within the wind power plant generator and gear area.

9. The device of claim 1, wherein the wind power plant comprises:
   a) a vertical column member embedded within a bed surface of a body of water, the vertical member having a top and bottom portion wherein the bottom portion extends through the body of water and into the bed surface and the top portion extends out into an area above the body of water, and
   b) a fan member having at least two blades mounted at the vertical column top portion, the fan member blades turning in response to a wind force exerted thereupon.

10. A device for prohibiting the penetration of corrosively acting salt particles into a generator and gear area of a wind power plant, the device comprising:
    a) a compressor for introducing air under an overpressure into at least a substantially closed portion of the wind power plant generator and gear area;
    b) filtering means coupled along an air flow channel before the generator and gear area for separating moisture and salt particles from air introduced into the generator and gear area by the compressor;
    c) an air inlet port disposed proximal to the generator and gear area along a downwind side of the wind power plant;
    d) a settling hose coupled at a first end to the air inlet port and at a second end to the filtering means; and
    e) a settling tank coupled along the settling hose intermediate the air inlet port and the filtering means.

11. The device of claim 10, wherein the generator and gear area is located in a top portion of the wind power plant.

12. The device of claim 10, wherein the filtering means is a turbulence chamber.

13. The device of claim 10, further comprising an air pressure sensor for monitoring air pressure within the wind power plant generator and gear area and for regulating the capacity of the compressor.

14. The device of claim 10, further comprising at least one flow-caused air inlet opening for building up a dynamic pressure and producing an introduction pressure difference within the wind power plant generator and gear area.

15. The device of claim 10, further comprising an air outlet opening for building up a suction vacuum and producing an introduction pressure difference within the wind power plant generator and gear area.

16. The device of claim 10, wherein the wind power plant comprises:
    a) a vertical column member embedded within a bed surface of a body of water, the vertical member having a top and bottom portion wherein the bottom portion extends through the body of water and into the bed surface and the top portion extends out into an area above the body of water, and
    b) a fan member having at least two blades mounted at the vertical column top portion, the fan member blades turning in response to a wind force exerted thereupon.

17. A device for prohibiting the penetration of corrosively acting salt particles into a generator and gear area of a wind power plant, the device comprising:
    a) a compressor for introducing air under an overpressure into at least a substantially closed portion of the wind power plant generator and gear area;
    b) filtering means coupled along an air flow channel before the generator and gear area for separating moisture and salt particles from air introduced into the generator and gear area by the compressor;
    c) an air inlet port disposed proximal to the generator and gear area along a downwind side of the wind power plant;
    d) a settling hose coupled at a first end to the air inlet port and at a second end to the filtering means;
    e) a settling tank coupled along the settling hose intermediate the air inlet port and the filtering means;
    f) the wind power plant comprising a vertical column member embedded within a bed surface of a body of water and having a top and bottom portion wherein the bottom portion extends through the body of water and into the bed surface and the top portion extends out into an area above the body of water, and a fan member having at least two blades mounted at the vertical column top portion, the fan member blades turning in response to a wind force exerted thereupon; and
    g) the generator and gear area located in the wind power plant top portion.

18. The device of claim 17, wherein the filtering means is a turbulence chamber.

19. The device of claim 17, further comprising an air pressure sensor for monitoring air pressure within the wind power plant generator and gear area and for regulating the capacity of the compressor.

20. The device of claim 17, further comprising:
    a) at least one flow-caused air inlet opening for building up a dynamic pressure and producing an introduction pressure difference within the wind power plant generator and gear area; and
    b) an air outlet opening for building up a suction vacuum and producing an introduction pressure difference within the wind power plant generator and gear area.

* * * * *